March 17, 1970 JAMES E. WEBB 3,501,649

ADMINISTRATOR OF THE NATIONAL AERONAUTICS AND SPACE ADMINISTRATION

DC-COUPLED NONINVERTING ONE-SHOT

Filed May 17, 1967

INVENTOR
FRANCIS M. PAN
BY D. E. Leslie
G. J. McCoy
ATTORNEYS 3,501,649
Patented Mar. 17, 1970

3,501,649

DC-COUPLED NONINVERTING ONE-SHOT

James E. Webb, Administrator of the National Aeronautics and Space Administration, with respect to an invention of Francis M. Pan, Los Angeles, Calif.

Filed May 17, 1967, Ser. No. 640,459
Int. Cl. H03k 3/26
U.S. Cl. 307—273 6 Claims

ABSTRACT OF THE DISCLOSURE

A one-shot providing an output at the collector of a transistor which is of the same polarity as the controlling input level. The duration of the outpulse is a function of the time required for a capacitor to charge up to a level at which the transistor is driven to conduction. The capacitor is not connected between the transistor and the input source, so that the one-shot may be thought of as DC coupled.

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Description of the prior art

Practically all timing or discriminating circuits known as one-shot multivibrators employ either a plurality of active elements, such as transistors or are AC (alternating current) coupled by means of a capacitor between the source of the input signal and the transistor. Also, prior one-shot multivibrators provide an output signal which is generally inverted, potentialwise with respect to the input signal. Either or both features are often undesirable.

OBJECTS AND SUMMARY OF THE INVENTION

It is an object of the invention to provide a new simple one-shot multivibrator.

Another object is the provision of a transistorized one-shot multivibrator which provides a noninverted output signal.

A further object is the provision of a one-shot multivibrator which employs a single transistor and provides a noninverted output signal.

Still a further object is to provide a one-shot multivibrator which is directly coupled to a source of input signals and provides a noninverted output signal.

Another object is to provide a one-shot multivibrator which derives its power source from the input pulse.

These and other objects are achieved by a single transistor circuit in which the collector, forming the output terminal is connected to the base through resistors. One resistor is shunted by a diode, the cathode of which is connected to a source of input signals, with the anode connected to the collector. The diode is forward biased when the transistor is cut off while being reversed biased when the transistor is conducting. The emitter in one embodiment is connected to source of bias potential. In the same embodiment, the base is also connected through a capacitor to a second bias potential, while in another embodiment the emitter is directly connected to a reference potential such as ground, and the base is connected to ground through the capacitor.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
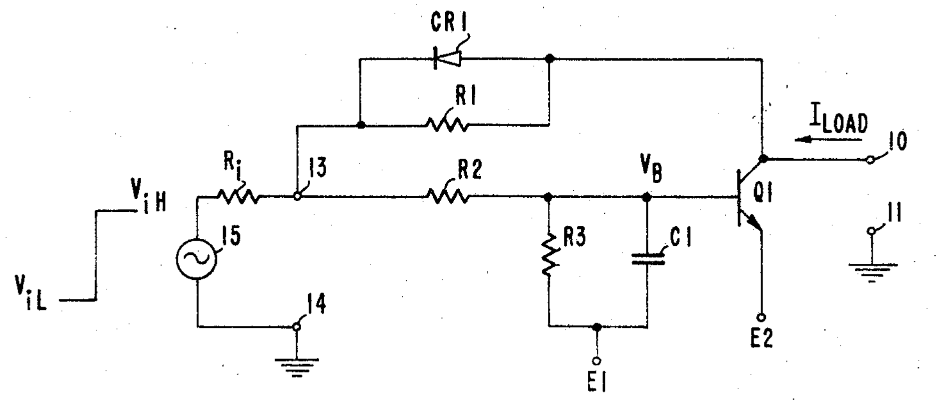
FIGURE 1 is a schematic diagram of one embodiment of the invention.

Attention is directed to FIGURE 1 in which one embodiment of the invention is diagrammed. It includes a transistor Q1 which for exemplary purposes, it shown as being of the NPN type. The transistor comprises a collector, shown connected to one output terminal 10, the other terminal 11 being shown connected to a reference potential such as ground. The emitter of Q1 is connected to a bias potential designated E2, while the base is connected to the collector, through serially connected R1 and R2. Also, the base is connected to a bias potential E1, through parallel connected R3 and capacitor C1. A diode CR1 is connected across R1, with the anode thereof connected to the collector and the cathode to a junction point 13, which also defines an input terminal of the circuit. Another input terminal 14 is connected to ground.

A source of input signals, generally designated by numeral 15 is connected between terminal 13 and 14. The internal impedance of source 15 is diagrammed by resistors R*i*. The low and high input levels, provided by source 15 are designated in FIGURE 1 by $V_{iL}$ and $V_{iH}$ respectively. The impedance of source 15 when levels $V_{iL}$ and $V_{iH}$ are provided will hereafter be referred to as R*i*L and R*i*H respectively.

Briefly, when the output level of source 15 is low, transistor Q1 is cut off and the output level at the collector or output terminal 10 is equal to the input level, plus the voltage drop across diode CR1. Then, when the input level is switched to $V_{iH}$, transistor Q1 is switched to conduction to generate a single output pulse whose length is a function of capacitor C1.

When the input level is $V_{iL}$, transistor Q1 is cut off and capacitor C1 is charged to a value $V_{B\ off}$, where $$V_{B\ off}(\text{Max.}) \leq E2(\text{Min.}) \qquad (1)$$

Neglecting the leakage currents in transistor Q1, as will be assumed hereafter, $V_{B\ off}$ can be expressed as $$V_{B\ off} = \frac{E1(R2+RiL)+R3V_{iL}+R3RiLI_{Load}}{R2+RiL+R3} \qquad (2)$$

where $I_{Load}$ is the collector current.

In the cutoff state, the output voltage may be expressed as $$V_{out}(OFF) = V_{CR1} + \frac{RiL(R2+R3)I_{Load}+(R2+R3)V_{iL}+E1RiL}{R2+R3+RiL} \qquad (3)$$

When the level of source 15 rises to $V_{iH}$ diode, CR1 is reverse biased, but the collector level follows the level of the source 15 through R1. Thus, the output level rises together with the rise in the input level, resulting in a non-inverted output pulse. The output level may be designated $V_{out(H)}$. However, the input level at the base does not increase suddenly since the voltage across the capacitor C1 cannot change instantaneously. The capacitor tends to charge up towards a value $V_B$ which may be defined as $$V_{B\,(\text{Max.})} = \frac{(R2+RiH)E1+R3V_{iH}}{R2+R3+RiH} \qquad (4)$$

The time constant $T_c$ is $$T_C=\frac{R3(R2+RiH)C1}{R3+R2+RiH} \quad (5)$$

As the base voltage rises, when it reaches a value $E2+V_{BE(off)}$, where $V_{BE(off)}$ is the base to emitter voltage as Q1 starts to come out of the cutoff region and is switched into conduction. As a result, the collector level drops to $V_{out(ON)}=E2+V_{CE(ON)}$, where $V_{CE(ON)}$ is the collector to emitter voltage drop when Q1 conducts. Thus, the duration of the output pulse is limited to the time required for the capacitor C1 to charge to a voltage at which Q1 is switched into conduction.

Figure 2:
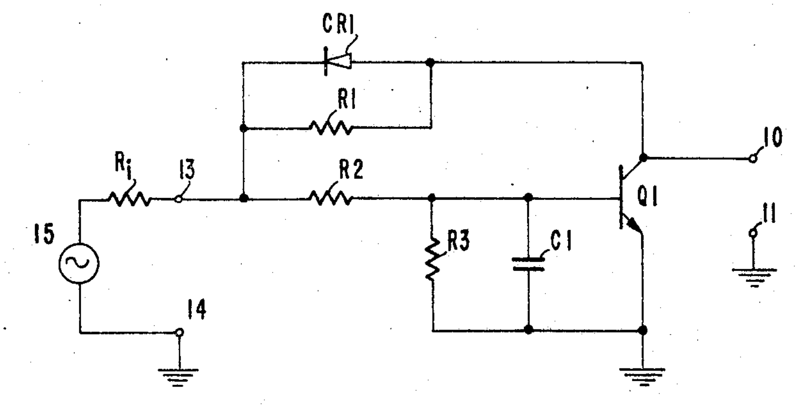
FIGURE 2 is a schematic diagram of another embodiment of the invention.

In another embodiment, the need for bias potentials E1 and E2 may be eliminated by connecting the emitter, as well as, C1 and R3 to ground potential. Such an arrangement is shown in FIGURE 2 in which elements, like those shown in FIGURE 1, are designated by like numerals. In such an arrangement no power source other than input source 15 is required.

Figure 3:
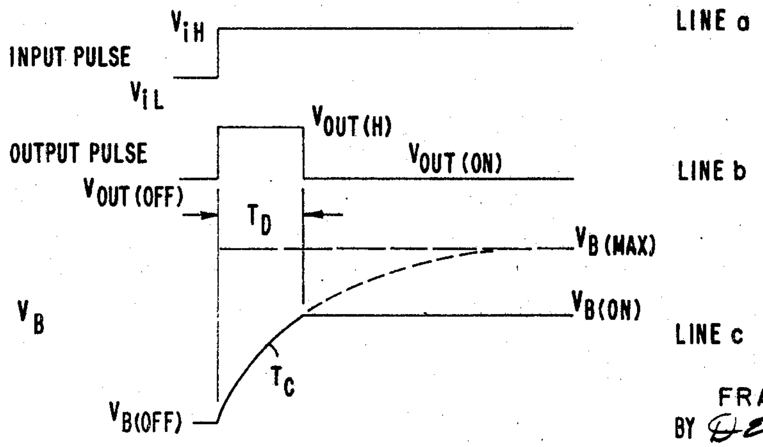
FIGURE 3 is a waveform diagram useful in explaining the mode of operation of the present invention.

Reference is now made to FIGURE 3 which is a waveform diagram useful in summarizing the invention.

In line *a* of FIGURE 3, an input pulse from source 15 is diagrammed, while line *b* represents the output level at the collector of Q1. Line *c* represents the change in the base voltage or level. As seen, when the input level is $V_{IL}$, the base voltage is $V_{B(off)}$ and the output level $V_{out(off)}$. Then, when the input level rises to $V_{IH}$, the output level also rises to $V_{out(H)}$, while the capacitor starts to charge up towards $V_{B(Max.)}$. However, when the level $V_{B(ON)}$ is reached after a time $T_D$, the transistor Q1 is switched to conduction and the output level drops to $V_{out(ON)}$. Thus, the duration of the output pulse (line *b*) equals the time required for the capacitor or base voltage to increase from $V_{B(off)}$ to $V_{B(ON)}$.

In light of the foregoing, it is seen that the circuit of the invention provides a single output pulse of the same polarity as the input pulse. Also, since the capacitor C1 is not connected between the input source 15 and the transistor Q1, the circuit may be thought of as a DC coupled circuit. Although the circuit has been described in conjunction with an NPN transistor, the teachings are applicable to a circuit with a PNP transistor.

There has accordingly been shown and described herein, a simple single transistor DC coupled one-shot multivibrator providing a non-inverted output pulse in response to an input pulse. It should be appreciated that those familiar with the art may make modifications in the arrangement without departing from the spirit of the invention. Therefore, all such modifications are deemed to fall within the scope of the invention as defined in the appended claims.

What is claimed is:

1. A transistorized circuit comprising:

a transistor having collector, base and emitter electrode;

a first resistor connected to said collector electrodes;

a second resistor connected to said base electrode;

means connecting the first and second resistors at a first junction point whereby said first and second resistors are connected in series across the collector to base junction of said transistor;

a diode connected in parallel across said first resistor;

a capacitor having one end connected to said base electrode; and means connecting said emitter electrode and a second end of said capacitor to at least one reference potential, said first junction point being adapted to receive an input pulse of a selected polarity, whereby the level of said collector changes in the direction of the polarity of said input pulse for a duration, which is a function of the time required for said transistor to switch to a conductive state.

2. The transistorized circuit as recited in claim 1 wherein said input pulse is directly supplied to the base electrode through said second resistor, the time required for said transistor to switch to said conductive state being a function of the time required for said capacitor to reach a preselected potential which is a function of the potential at said emitter electrode.

3. The transistorized circuit as recited in claim 2 wherein said emitter electrode is connected to a first potential and said capacitor is connected to a second potential, said circuit further including a third resistor connected across said capacitor, the time required for said capacitor to reach said preselected potential being a function of said second and third resistors and the capacitance of said capacitor.

4. The transistorized circuit as recited in claim 3 wherein said transistor is an NPN type transistor, and said diode being forward biased when said transistor is in a nonconductive state and reversed biased when said transistor is in a conductive state.

5. The transistorized circuit as recited in claim 2 wherein said emitter electrode and said capacitor are connected to a common reference potential, said circuit further including a third resistor connected across said capacitor, the time required for said capacitor to reach said preselected potential being a function of said second and third resistors and the capacitance of said capacitor.

6. The transistorized circuit as recited in claim 5 wherein said transistor is an NPN type transistor, and said diode being forward biased when said transistor is in a nonconductive state and reversed biased when said transistor is in a conductive state.

References Cited

UNITED STATES PATENTS 3,067,344 12/1962 Branum et al.

3,219,838 11/1965 Hurst ---------------- 307—269

DONALD D. FORRER, Primary Examiner

J. D. FREW, Assistant Examiner

U.S. Cl. X.R.

307—246, 293; 328—207